United States Patent
Dion

(10) Patent No.: US 6,298,537 B1
(45) Date of Patent: Oct. 9, 2001

(54) PALLET RACK REPAIR SYSTEM

(76) Inventor: Dany Dion, 2583 Adonis, La Plaine, Quebec (CA), J7M 2B1

( * ) Notice: Subject to any disclaimer, the term of this patent is extended or adjusted under 35 U.S.C. 154(b) by 0 days.

(21) Appl. No.: 09/414,222

(22) Filed: Oct. 7, 1999

Related U.S. Application Data

(63) Continuation-in-part of application No. 09/149,987, filed on Sep. 9, 1998, now abandoned.

(30) Foreign Application Priority Data

Mar. 13, 1998 (CA) .................................................. 2232178

(51) Int. Cl.[7] .......................... A47B 43/00; A47B 57/00; B23P 6/00
(52) U.S. Cl. .................................... 29/402.06; 29/402.11; 29/402.12; 211/189
(58) Field of Search .................................... 211/189, 191, 211/192, 207; 248/243, 544; 29/402.08, 402.12, 402.06, 402.11

(56) References Cited

U.S. PATENT DOCUMENTS

| | | | | |
|---|---|---|---|---|
| 3,142,386 | * | 7/1964 | Skubic ............................. | 211/192 X |
| 3,273,720 | * | 9/1966 | Seiz ...................................... | 211/148 |
| 3,630,392 | * | 12/1971 | Cintract .................................. | 214/1 P |
| 3,854,686 | * | 12/1974 | Konstant .............................. | 248/243 |
| 3,871,525 | * | 3/1975 | Al-Dabbagh et al. ............... | 211/176 |
| 3,879,144 | * | 4/1975 | Eckerbrecht ......................... | 403/232 |
| 3,911,548 | * | 10/1975 | Perry ............................. | 29/402.12 X |
| 4,023,683 | * | 5/1977 | Vargo .................................. | 211/192 |
| 4,033,080 | * | 7/1977 | Fukushima .................... | 29/402.12 X |
| 4,048,779 | * | 9/1977 | Valenziano et al. .......... | 29/402.12 X |
| 4,064,996 | * | 12/1977 | Shillum ................................ | 211/191 |
| 4,074,812 | * | 2/1978 | Skubic et al. ....................... | 211/192 |
| 4,088,229 | * | 5/1978 | Jacoby et al. ....................... | 211/191 |
| 4,122,954 | * | 10/1978 | Slater .................................. | 211/133 |
| 4,708,252 | * | 11/1987 | Azzi .................................... | 211/192 |
| 5,012,938 | * | 5/1991 | King .................................... | 211/191 |
| 5,289,665 | * | 3/1994 | Higgins ................................ | 52/721 |
| 5,369,925 | * | 12/1994 | Vargo .............................. | 211/191 X |
| 5,377,851 | * | 1/1995 | Asamo et al. ....................... | 211/191 |
| 5,636,482 | * | 6/1997 | Klager ................................. | 52/170 |
| 6,135,419 | * | 10/2000 | Hutson, Jr. et al. ................. | 52/170 |

* cited by examiner

*Primary Examiner*—Daniel P. Stodola
*Assistant Examiner*—Khoa Tran
(74) *Attorney, Agent, or Firm*—Eric Fincham

(57) ABSTRACT

A method for repairing pallet racks wherein the assembly is used to replace a damaged front post. The repair assembly includes a tubular post having a floor plate at a lower end and a support plate at an upper end with a horizontal brace and a diagonal brace to replace the existing braces. The assembly is structurally solid and has the diagonal brace placed sufficiently high above the floor to avoid damage by forklift trucks.

1 Claim, 3 Drawing Sheets

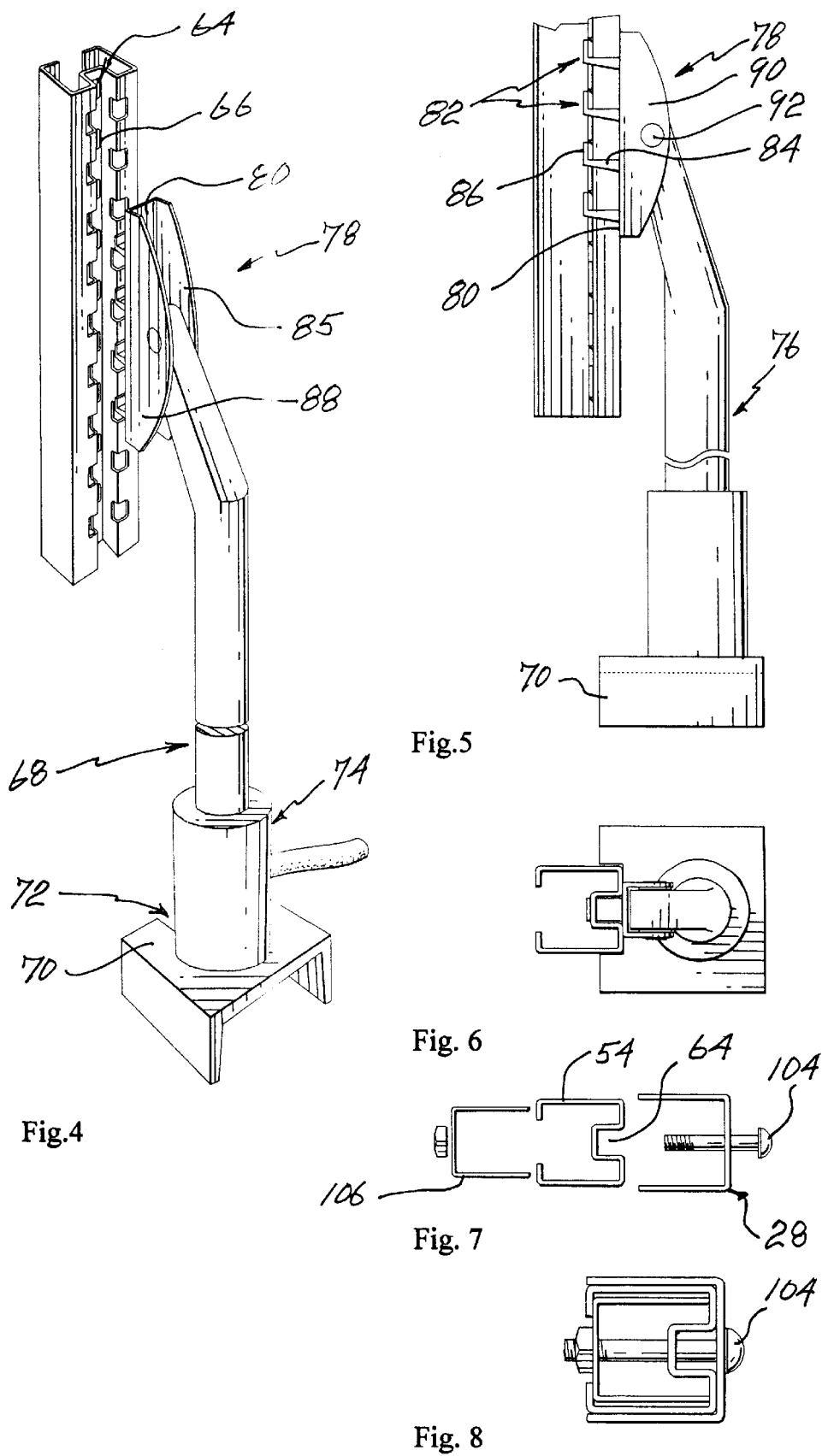

PALLET RACK REPAIR SYSTEM

The present application is a continuation-in-part of application Ser. No. 09/149,987 filed Sep. 9, 1998 now abandoned.

BACKGROUND OF THE INVENTION

The present invention relates to pallet racking arrangements and more particularly, relates to a method system for repair of pallet racks.

Pallet racks originally received wide usage in warehouses wherein typically they would extend in a plurality of rows for substantially the height of the building with space being provided between the rows for forklift trucks to move. The forklift trucks would then remove stock from the shelves for the shipping of quantities thereon or for further processing.

More recently, the opening of large warehouse stores to the public have utilized such pallet racks for direct access by the consumer. In this arrangement, the warehouse and retail functions are combined.

Inherently, there are dangers in such a system and safeguards against collapse must be provided. To date, most of the safety concerns have centered around the various design criteria to ensure that the pallet racks are capable of accepting the loads to which they are subjected. Normally, the pallet racks are of a knock down design wherein the shelves or beams are hooked onto a post. The posts are generally perforated to receive the hook elements and various designs of the post have been proposed in the art. One may, for example, refer to U.S. Pat. No. 4,064,996 illustrating such a post structure.

While the use of pallet racks achieves substantial economies for the user, they are very susceptible to damage. Inherently, the loaded pallets must be lifted onto the racks by fork lift trucks. Due to the sometimes limited spaces, accidents are quite frequent wherein the fork lift truck will accidentally collide with one of the support posts. With the very high loads which the pallet racks carry, this is a dangerous situation and any post even slightly damaged must be replaced.

In order to replace the damaged post, the loaded pallets must be removed from the structure and the rack disassembled. After repair, the pallets must then be reloaded on the structure.

The above process is both an expensive and time consuming one. Frequently, once the post has been damaged, the forces acting on the structure will then cause damage to some of the bracing and beams. For safety reasons, it frequently becomes necessary to replace a substantial portion of the structure.

Although it has been proposed in the art to provide post protectors—see U.S. Pat. No. 4,113,110, such post protectors do not assist in preventing damage to the post at a height above the protector.

SUMMARY OF THE INVENTION

It is an object of the present invention to provide a method for the repair of pallet racks, which method minimizes the downtime when repairing a damaged post.

It is a further object of the present invention to provide a repair system for the repair of damaged pallet racks.

According to one aspect of the present invention, there is provided a repair assembly for pallet racks comprising a tubular post having an upper end and a lower end, a floor bearing plate secured to the tubular post at the lower end thereof, a horizontal support plate secured to the tubular post at the upper end thereof, a connecting member secured to the upper end of the tubular post, a horizontal brace extending perpendicularly outwardly from a wall of the tubular post, a horizontal brace clamping member located at a distal end of the horizontal brace, a diagonal brace extending upwardly and outwardly from the wall of the tubular post, and a diagonal brace clamping member located at a distal end of the diagonal brace.

In a further aspect of the present invention, there is provided a method of repairing a pallet rack having a front post with a damaged lower portion and an undamaged upper portion, the method comprising the steps of supplying a repair assembly comprising a tubular post having an upper end and a lower end, a floor bearing plate secured to the tubular post at the lower end thereof, a support plate secured to the tubular post at the upper end thereof, a connecting member secured to the upper end of the tubular post, a horizontal brace extending perpendicularly outwardly from a wall of the tubular post, a horizontal brace clamping member located at a distal end of the horizontal brace, a diagonal brace extending upwardly and outwardly from the wall of the tubular post, and a diagonal brace clamping member located at a distal end of the diagonal brace, placing a lifting mechanism adjacent the post, the lifting mechanism having means to engage and hold the undamaged upper portion of the post, lifting the post a sufficient distance to transfer all weight bearing on the damaged portion to the lifting mechanism, cutting and removing the damaged lower portion and associated horizontal brace and diagonal brace, placing the repair assembly defined above such that the tubular post replaces the damaged lower portion of the front post, lowering the undamaged upper portion of the front post on the support plate, and attaching the connecting member secured to the upper end of the tubular post to the undamaged upper portion of the front post, and securing the clamping means located at the distal ends of the horizontal brace and the diagonal brace to a rear post of the pallet rack.

In greater detail, the repair assembly of the present invention is designed to work with all standard pallet racks. In this respect, it will be understood that different pallet racks will have different dimensions and the repair assembly will be configured accordingly.

The repair assembly of the present invention is designed to be sufficiently sturdy to permanently replace the damaged portion of the pallet rack and to withstand any further damage from lift trucks and the like. Accordingly, it is constructed of sufficiently robust material and in preferred embodiments, the post and braces are made of steel between ¼ and ³⁄₁₆ inch thick. The same material will be used for the connecting members.

As previously mentioned, damage frequently occurs when a portion of the forklift truck hits the upright post. To the best of Applicant's knowledge, all of the horizontal and diagonal braces are located at a relatively low height and particularly in the case of the diagonal brace, the low height can lead to the danger of the whole structure crumpling. In the present invention, the diagonal brace is situated at least 40 cm and preferably 45 cm above the floor bearing plate. This has been found to be significant as it is above all portions of commercially available forklift trucks which would be likely to make contact with the post.

It is also preferred that the diagonal post form an angle of between 20 and 30 degrees with respect to the horizontal and more preferably, between 25 and 28 degrees. This angle is important in ensuring the overall rigidity of the structure.

BRIEF DESCRIPTION OF THE DRAWINGS

Having thus generally described the invention, reference will be made to the accompanying drawings illustrating an embodiment thereof, in which:

FIG. 4 is a perspective view of the equipment utilized during replacement of the damaged post of the pallet rack;

FIG. 5 is a side view illustrating engagement of the equipment with the damaged post;

FIG. 6 is a top plan view of the equipment of FIG. 5;

FIG. 7 is a exploded view of the means of securing the repair assembly to the post; and FIG. 8 is a cross sectional view of the assembled connector of FIG. 7.

DESCRIPTION OF THE PREFERRED EMBODIMENTS

Figure 1:
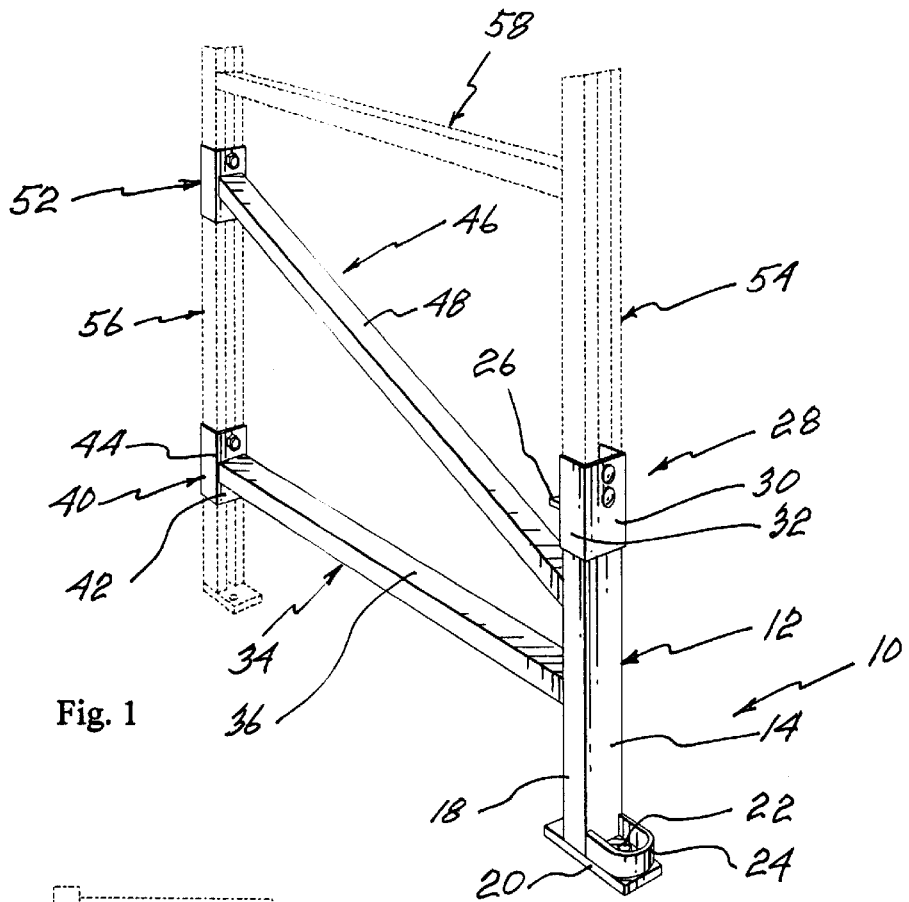
FIG. 1 is a perspective view of a repair system according to the present invention.

Referring to the drawings in greater detail, and by reference characters thereto, there is illustrated in FIG. 1 a repair assembly which is generally designated by reference numeral 10.

Repair assembly 10 includes a tubular post 12, having a front wall 14, an opposed side wall 16, and a pair of side walls, only one side wall 18 being shown.

Located at the bottom of tubular post 12 is a floor bearing plate 20. Floor bearing plate 20 extends beyond both front wall 14 and back wall 16; the portion extending past front wall 14 has an aperture 22 therein to receive a fastening member such as a bolt which will be secured to the floor. A C-shaped bolt guard 24 extends substantially about the periphery of the portion extending beyond front wall 14 to protect the bolt from damage. Similarly, an aperture is provided in the portion of floor bearing plate 20 extending past back wall 16.

At the upper end of tubular post 12 there is a horizontal plate 26 welded thereto. Also surrounding horizontal plate 26 and the upper portion of tubular post 12 is a C-shaped connector 28 having a front wall 30, a portion of which lies in juxtaposition with front wall 14 of tubular post 12, there remaining portion extending upwardly to receive the existing post of the pallet rack as will be discussed in greater detail hereinbelow. Similarly, side wall 32 lies in juxtaposition to side wall 18 of tubular post 12.

A horizontal brace 34 extends outwardly from back wall 16. Horizontal brace 34 has an upper wall 36 and a bottom wall 38 which are substantially the same as back wall 16 to thereby provide a very strong connection. Similarly, a diagonal brace 46 extends diagonally outwardly and upwardly from back wall 16. In this respect, it will be noted that diagonal brace 46 is located a distance above horizontal brace 34 and extends at an angle of approximately 26 degrees. Diagonal brace 46 includes a top wall 48 and a bottom wall 50 which are slightly narrower than back wall 16 of tubular post 12.

A C-shaped connector generally designated by reference numeral 40 is located at the distal end of horizontal beam 34 and includes a front wall 42 and a pair of side walls, only one side wall 44 being shown. Similarly, a C-shaped connector 52 is provided at the distal end of diagonal brace 46.

Figure 2:
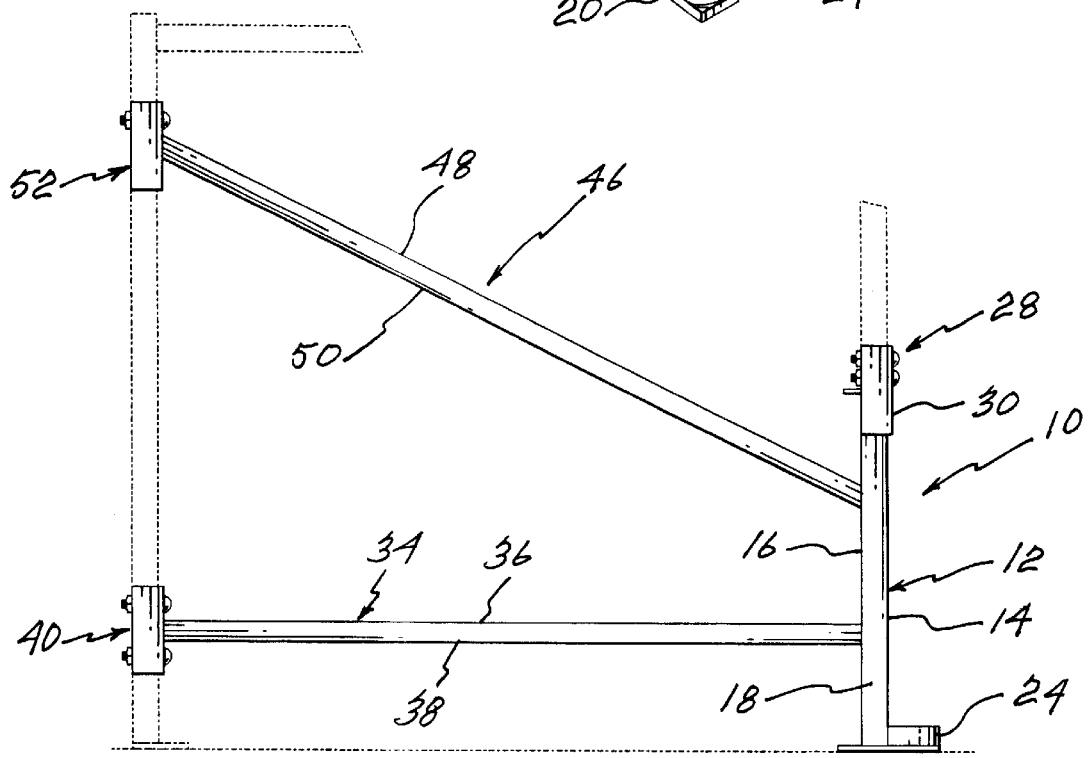
FIG. 2 is a side elevational view thereof.

Repair assembly 10, in FIGS. 1 and 2, is shown after having replaced a portion of a damaged post 54 as used in a conventional pallet rack arrangement. In the pallet rack arrangement there is also provided a rear post 56 and an upper horizontal brace 58.

Each of posts 54 and 56, and as may be best seen in FIG. 4, is of a formed steel having an inwardly extending channel 64 with apertures 66 located therein. This is similar to the arrangement shown, for example, in U.S. Pat. No. 4,064,996 to Shillum.

The tubular post 12, horizontal brace 34 and diagonal brace 46, on the other hand, are preferably formed of a solid non apertured metallic material and will thus be able to withstand impact by truck lift forks and the like.

In practicing the method of the present invention, reference will now be made to the steps involved therein.

There is provided a lifting mechanism generally designated by reference numeral 68 and which includes a base 70 having a recess 72 formed therein to permit placement of the lifting mechanism proximate to front post 54. Mounted on base 70 is a hydraulic jack 74 having an arm 76 extending upwardly therefrom. At the distal end of arm 76 there is provided a post engaging attachment generally designated by reference numeral 78. Post engaging attachment 78 will be specific to the type of post being repaired and thus a number of different attachments may be employed.

Post engaging attachment 78 includes a front wall 80 from which a plurality of members 82 extend. Each member 82 has a horizontal portion 84 which is substantially perpendicular to front wall 80 and an upwardly extending portion 86. A pair of side walls 88 extend rearwardly from front wall 80, each side wall 88 having an aperture 90 formed therein to receive a pin 92 for attachment to arm 76.

Referring to FIGS. 3, 3a, 3b and 3c, there is illustrated front post 54 which has been hit by a lift truck and has a lower damaged portion 96 and an upper undamaged portion 98 (horizontal and diagonal braces not shown). Initially, lifting mechanism 68 is placed into position whereby members 82 extending from front wall 80 will engage with upper undamaged portion 98 through apertures 66. Hydraulic jack 74 is then operated to lift post 54 to the extent necessary to remove any weight bearing on lower damaged portion 96. Lower damaged portion 96 is then removed as indicated by cut line 100.

Figure 3:
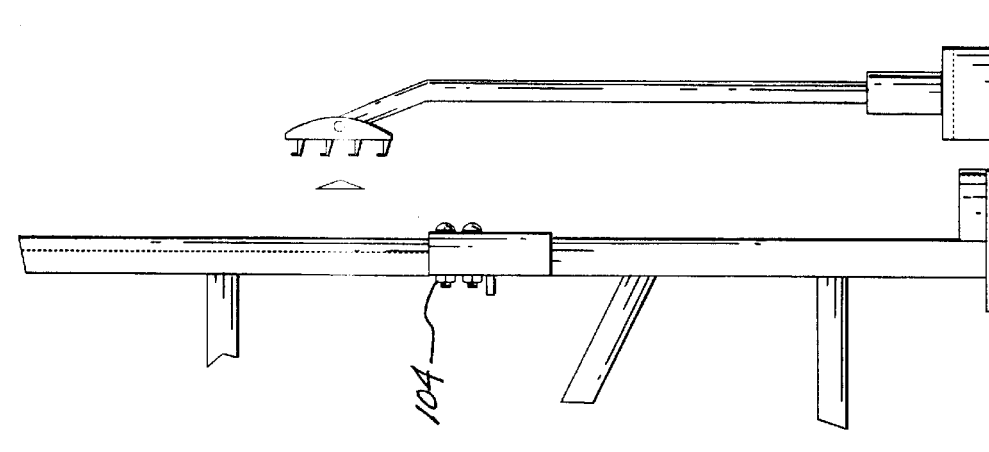
FIGS. 3, 3a, 3b and 3c illustrate the replacement of a damaged post of a pallet rack.
Figure 3A:
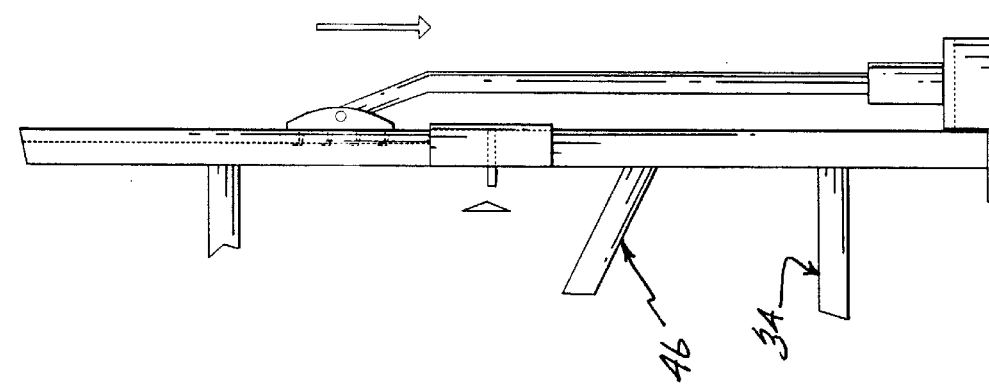
Figure 3B:
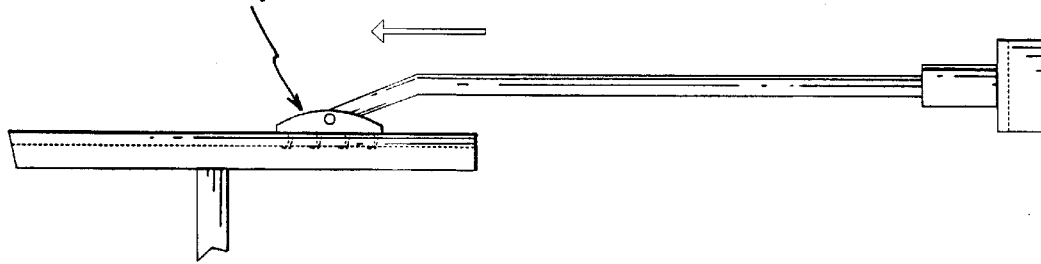
Figure 3C:
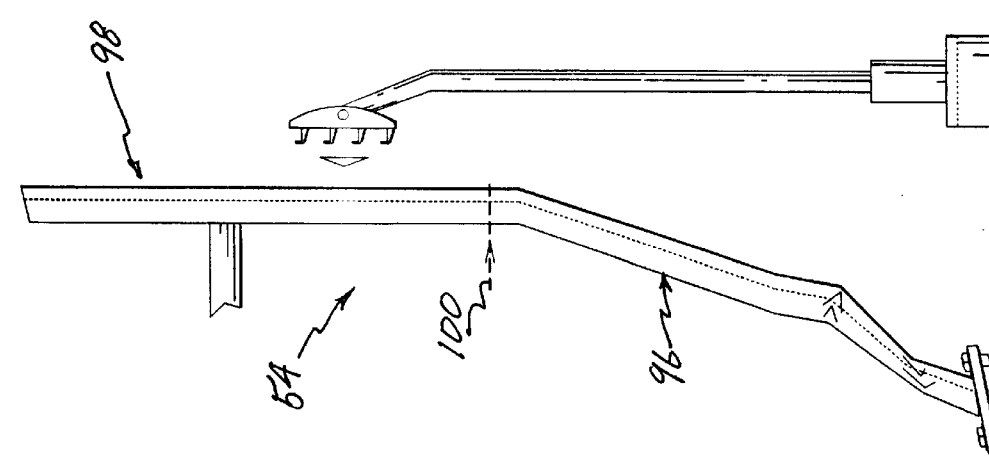

Subsequently, repair assembly 10 is moved into position as shown in FIG. 3b and hydraulic jack 74 is then lowered to permit the bottom end of upper undamaged portion 98 to rest on horizontal plate 86. A rear C-shaped reinforcing plate 106 is placed inwardly of channel 64 and bolts 104 are then secured through C-shaped connector 28. A similar procedure is followed with respect to connectors 40 and 52 located at the distal ends of horizontal brace 34 and diagonal brace 46 respectively.

It will be understood that the above described embodiments are for purposes of illustration only and that changes and modifications may be made thereto without departing from the spirit and scope of the invention.

I claim:

1. A method of repairing a pallet rack having a front post with a damaged lower portion and an undamaged upper portion, the method comprising the steps of:

supplying a repair assembly comprising a tubular post having an upper end and a lower end, a floor bearing plate secured to said tubular post at said lower end thereof, a support plate secured to said tubular post at said upper end thereof, a connecting member secured to said upper end of said tubular post, a horizontal brace extending perpendicularly outwardly from a wall of said tubular post, a horizontal brace clamping member located at a distal end of said horizontal brace, a diagonal brace extending upwardly and outwardly from said wall of said tubular post, and a diagonal brace clamping member located at a distal end of said diagonal brace;

placing a lifting mechanism adjacent said post, said lifting mechanism having means to engage and hold said undamaged upper portion of said post;

lifting said post a sufficient distance to transfer all weight bearing on said damaged portion to said lifting mechanism;

cutting and removing said damaged lower portion and associated horizontal brace and diagonal brace, placing said repair assembly such that said tubular post replaces said damaged lower portion of said front post, lowering said undamaged upper portion of said front post on said support plate, and attaching said connecting member secured to said upper end of said tubular post to said undamaged upper portion of said front post; and securing said clamping means located at the said distal ends of said horizontal brace and said diagonal brace to a rear post of said pallet rack.

* * * * *